United States Patent Office 3,002,829
Patented Oct. 3, 1961

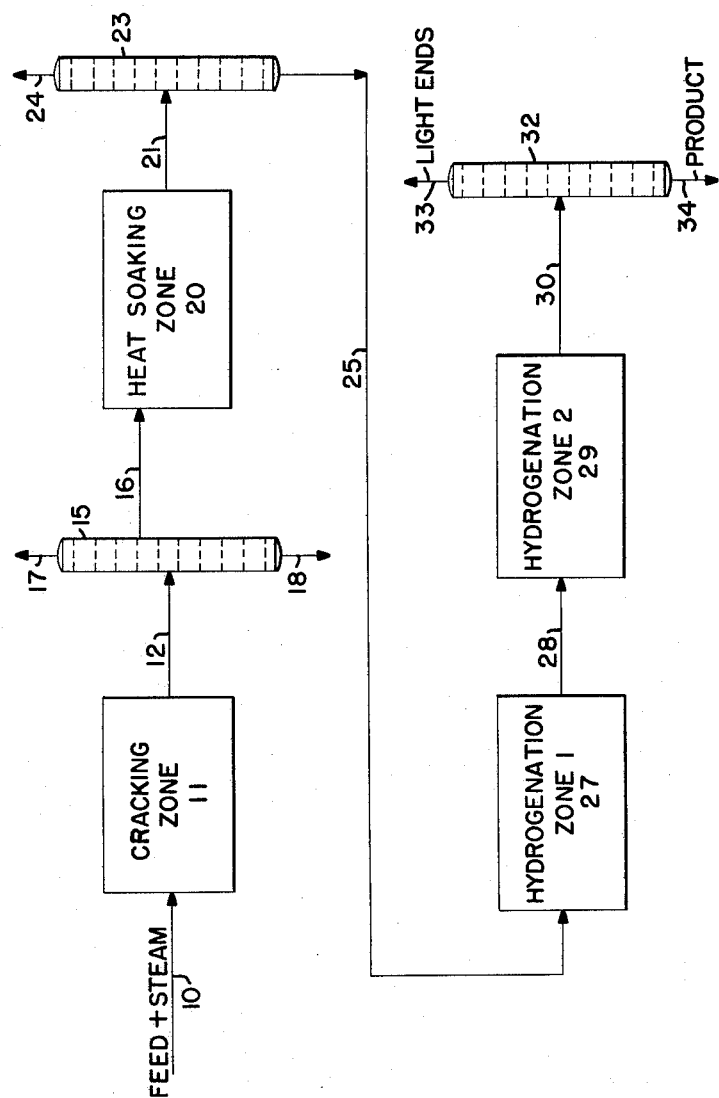

3,002,829
JET AND ROCKET FUELS AND
PREPARATION THEREOF
John J. Kolfenbach, North Plainfield, and Herbert K. Wiese, Cranford, N.J., assignors to Esso Research and Engineering Company, a corporation of Delaware
Filed Apr. 1, 1958, Ser. No. 725,564
10 Claims. (Cl. 52—.5)

The present invention relates to the production of high-heat-value fuels. More particularly, it concerns fuels used for jet propulsion, whether of the rocket jet propulsion or the jet engine type.

In jet propulsion the driving force of the body is produced by the forwardly directed forces of the reaction resulting from the rearward discharge from the body of a jet (a high speed stream) through an orifice. The forces responsible for the propulsion are exerted usually against the inside of the forward part of the body and are opposed to those expended by the rearward discharge of the jet.

A jet engine has one or more combustion chambers and one or more exhaust nozzles for the rearward discharge of a continuous or intermittent stream of fluid, usually heated air and exhaust gases. A jet plane may be powered by a jet engine that utilizes the surrounding air in the combustion of fuel or by a jet engine of the rocket type that carries its fuel and all the oxygen or other oxidizing agent necessary for combustion, and therefore functions independently of atmospheric oxygen.

There are three basic types of jet engines: ram jets, turbo-jets and pulse jets. The working cycles of the ram jet and turbo-jet are essentially the same. The ram jet differs from the turbo-jet in that compression in the former is obtained by the ramming effect of the oncoming air, while in the latter, air is forced into the combustion zone by means of a gas turbine. In the pulse jet engine, compression is obtained by the ramming effect of the oncoming air and the intermittent explosions of fuel which close the valves in the upstream portion of the combustion zone.

All of these jet engines operate in the same basic manner. Air enters the engine at the forward end and is heated by fuel burning in the combustion zone. The air and exhaust gases flow from the combustion zone through a rearwardly extending conduit at a velocity higher than the flying speed of the airplane. The thrust produced equals the gas mass flowing through the exhaust duct times its increase in speed, according to the law of momentum.

Jet and rocket fuels that are high in energy are needed to extend the range of jet propelled aircraft. These aircraft are volume limited rather than weight limited. Therefore it is most desirable to employ fuels having a high heat of combustion per unit volume. Paraffinic hydrocarbons have a high heat value but their low specific gravity reduces their usefulness in long range aircraft.

It has now been discovered that a very desirable high energy fuel for jet engines can be prepared by a two-step hydrogenation of a crude mixture of the dimers of cyclopentadiene and methyl cyclopentadienes obtained by heat treatment of products from the cracking of gas oils, kerosenes or heavy naphthas. Because of the high heat value and high specific gravity of this hydrogenated product it is possible to extend the range of rocket and jet aircraft without increasing the size of the fuel reservoir. In addition this fuel has excellent low temperature fluid properties.

In accordance with the present invention, a hydrocarbon fraction boiling in the range of 140°–850° F., such as gas oil or kerosene, is cracked at temperatures of the order of 1000 to 1600° F. and at pressures of the order of 1 to 25 atmospheres, preferably in the presence of steam, and a fraction boiling in the range of about 75° to 350° F. is segregated from the cracked products. This fraction will contain from 70 to 95% of a mixture of cyclopentadiene, methyl cyclopentadiene and dimethyl cyclopentadiene. The crude mixture is heat soaked for a maximum of about 6 hours at 175° to 250° F. to form a product containing a mixture of the dimers of the cyclopentadienes. The dimerized product is topped to obtain as bottoms a material containing $C_{10}$ and higher hydrocarbons and the bottoms are subjected to a two-step hydrogenation to form the tetrahydro derivatives of the mixture of cyclopentadiene dimers.

The invention may be more readily understood if reference is made to the accompanying drawing in which the single figure is a schematic diagram of a suitable process for practicing this invention.

Referring to the drawing, the oil feed along with from 70 to 95% of steam is conducted into a thermal cracking zone 11 by means of line 10. Temperatures of the order of 1000 to 1600° F. and preferably of the order of 1200 to 1450° F. are maintained in the cracking zone 11. A pressure of from 1 to 25 atmospheres and preferably of from 1 to 10 atmospheres is maintained in the cracking zone. A residence time of 5 seconds or less, preferably 0.1 to 3.5 seconds, is used.

The cracked products leave the thermal cracking zone through line 12 and are conducted to a fractionator 15 from which a fraction boiling from about 75° to about 200° F. is removed through line 16. Other fractions are removed through lines 17 and 18, for example. The fraction in line 16 is conducted into dimerization zone or heat soaking zone 20 wherein the material is subjected to a heat soaking treatment for from about ½ to about 6 hours at temperatures in the range of about 175° to 250° F. and preferably at temperatures of from about 200 to 220° F. at pressures of from 2 to 10 atmospheres. The product thereby obtained, which will comprise a mixture of dimers of cyclopentadiene, methyl cyclopentadiene and dimethyl cyclopentadiene, is then conducted by means of line 21 into a fractionator 23 wherein light ends are removed from the product through line 24 and the bottoms, consisting of hydrocarbons of ten carbon atoms and higher, are removed through line 25. The bottoms will consist of the dimers and possibly some trimers of from about 40 to 75% cyclopentadiene and from 45 to 15% of methyl cyclopentadiene.

Although these bottoms could be used as such as jet fuels, they would not be satisfactory because of their poor stability. Therefore, in accordance with the present invention, these bottoms are subjected to a two-step hydrogenation. They are first conducted by means of line 25 into hydrogenation zone 27 wherein hydrogenation to the dihydro derivatives is effected at temperatures ranging from about 75° to about 200° F. at hydrogen pressures of from 1 to 200 atmospheres using any of the known hydrogenation catalysts. A suitable catalyst comprises Raney nickel. Other hydrogenation catalysts that are suitable include platinum, platinum-alumina, copper chromite, cobalt molybdate and the oxides and sulfides of group VI metals. The catalyst may be deposited on carriers such as charcoal, magnesia, alumina or the like. Reaction times varying from 0.25 to 5 hours are preferred; however, this can be varied widely depending on catalyst, temperature and hydrogen pressure. For example, with 1% Raney nickel at temperatures ranging from 75° to 120° F. and hydrogen pressures ranging from 500 to 1000 p.s.i.g. a reaction time of about 30 to 45 minutes is required to give the dihydro derivative.

The product from the first hydrogenation step is conducted by mean of line 28 into a second hydrogenation zone 29 wherein conversion to the tetrahydro derivative is effected at temperatures ranging from about 225° F. to 450° F. and pressures of 30 to 200 atmospheres. The reaction time depends on catalyst, temperature and hydrogen pressure; however, reaction times in the order of 0.5 to 10 hours are preferred. The product of the second hydrogenation is conducted by means of line 30 into product fractionator 32 wherein the light ends are removed through line 33 and the jet fuel product is obtained by means of line 34.

The advantage of a two-step hydrogenation is that if hydrogenation of the fresh feed is attempted at temperatures above 250° F., cracking of the dimers tends to take place, leading to the formation of cyclopentane and/or methyl cyclopentane which are not highly desirable jet fuel components.

EXAMPLE

This invention may be illustrated by the following example. A fraction having a boiling range of from 77° F. to 345° F., that had been obtained by steam cracking a gas oil, was heat soaked for about 5 to 6 hours at 210° to 215° F. The product thus obtained was distilled to remove hydrocarbons of less than 10 carbon atoms. The bottoms thus obtained consisted principally of the dimers of cyclopentadiene and its methyl and dimethyl homologs, with the following analysis (as monomers): 37.1% cyclopentadiene, 48.3% methyl cyclopentadiene, 8.2% dimethyl cyclopentadiene, 4.3% acyclics and 1.7% toluene.

A 931 gram portion of the bottoms just described was subjected to a single step hydrogenation by contacting it with 7.5 grams of Raney nickel for ½ hour at an initial temperature of 77° F. and an initial hydrogen pressure of 485 p.s.i.g. As the reaction proceeded the temperature rose to a final value of 124° F. because of the heat of reaction. Also as additional hydrogen was introduced to replace that consumed in the reaction the hydrogen pressure was increased to a final value of about 1000 p.s.i.g. The recovered product amounted to 930 grams and had a density of 0.9293 at 20° C. and a bromine number of 122.8 centigrams per gram (theoretical bromine number 112).

Another portion of the above described bottoms, amounting to 934 grams, was subjected to a two stage hydrogenation by contacting it with 19 grams of Raney nickel in a first stage for ½ hour over a temperature range of 77° to 134° F. and a hydrogen pressure range of 800 to 1000 p.s.i.g., and with the same catalyst in a second stage for two hours over a temperature range of 232° F. initial temperature and 363° F. final temperature, and a hydrogen pressure range of 500 to 1000 p.s.i. The product obtained weighed 931 grams and had a density at 20° C. of 0.9067 and a bromine number of 1.2 centigrams per gram (theoretical value zero).

The data presented in Table I show the advantage of employing the tetrahydro derivatives of the present invention as compared with using the dimer of pure cyclopentadiene or the tetrahydro derivatives of the pure material. The tetrahydro derivatives of the pure materials were obtained by hydrogenation in two steps in essentially the same manner as were the tetrahydro bottoms described above. It will be noted that hydrogenation of the crude cyclopentadiene dimers resulted in a fuel of improved stability. Thus, the ASTM potential gum of a crude dicyclopentadiene fraction was reduced from 3106 to 1322 by hydrogenation to the dihydro stage, and to 69 by hydrogenation to the tetrahydro stage. Also, only the tetrahydro bottoms material has both the necessary low melting point and low ASTM potential gum.

Table I

| | M.P., °C. | ASTM Potential Gum [1] | Heat of Combustion, B.t.u./Gal. |
|---|---|---|---|
| C₁₀+ Bottoms | ≤−60 | 3,106 | 140,083 |
| Dihydro Bottoms | ≤−60 | 1,322 | 139,119 |
| Tetrahydro Bottoms | ≤−60 | 69 | 138,503 |
| Cyclopentadiene Dimer | 32.9 | 2,000+ | |
| Tetrahydro Derivative of Cyclopentadiene Dimer | 77–97 | | |
| Methyl Cyclopentadiene Dimer | ≤−60 | 2,000+ | 140,153 |
| Tetrahydro Methyl Cyclopentadiene Dimer | −30 | | 140,673 |

[1] ASTM Test D-873; reported as mg. gum/100 ml. fuel.

The tetrahydro bottoms material of the present invention has advantages over materials previously used as jet fuels. In Table II are presented data comparing the melting points and heats of combustion for a paraffin, a cycloparaffin, an aromatic, a polycyclic saturated hydrocarbon and the tetrahydro bottoms of the present invention. It will be noted that the tetrahydro bottoms has a heat of combustion advantage over all the materials and has a significant low tempertaure advantage over decalin, its nearest heat content competitor. Decalin has been used as a high energy fuel despite its poor low temperature properties.

Table II

| Material | Melting Point, °F. | Heat of Combustion, B.t.u./Gallon |
|---|---|---|
| n-nonane | −68 | 113,234 |
| Benzene | 41 | 125,900 |
| Methyl Cyclohexane | −195 | 120,290 |
| Decalin | −30 | 136,600 |
| Tetrahydro Bottoms | ≤−76 | 138,503 |

The dimer of cyclopentadiene is considered to have the following structure and may be identified as 4,7-methano-tetrahydroindene:

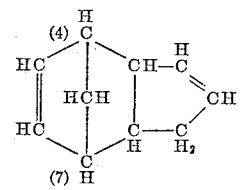

The dihydro product is 4,7-methano-hexahydroindene and the tetrahydro product is 4,7-methano-octahydroindene or 4,7-methano-hexahydroindane.

It is not intended that this invention be limited to the specific examples presented herein. The appended claims define its scope.

What is claimed is:

1. An improved jet fuel consisting essentially of the product obtained by heat soaking for from ½ to 6 hours at 175° to 250° F. a steam-cracked petroleum hydrocarbon boiling in the range of about 75 to 350° F. and containing cyclopentadiene, methyl cyclopentadiene and dimethyl cyclopentadiene, topping the heat-soaked product to produce as bottoms a material containing $C_{10}$ and higher hydrocarbons consisting of a crude mixture of dimers of from 40 to 75% cyclopentadiene and of from 15 to 45% of methyl cyclopentadiene, hydrogenating the said dimers in the presence of a hydrogenation catalyst at temperatures of from about 75° to about 200° F. and hydrogen pressures of from 1 to 200 atmospheres, whereby dihydro derivatives of the said dimers are formed, and thereafter subjecting the hydrogenated product to a second hydrogenation step at temperatures of from about 225° to about 450° F. whereby tetrahydro derivatives of the said dimers are obtained.

2. The method of preparing a jet fuel which consists in thermally cracking a petroleum hydrocarbon fraction boiling in the range of 140° to 850° F. in the presence of steam, thereby producing a mixture of hydrocarbons including cyclopentadiene, methyl cyclopentadiene and dimethyl cyclopentadiene, segregating from the said mixture a fraction boiling in the range of about 75° to 350° F. containing said cyclopentadienes, subjecting said fraction to heat soaking for from ½ to 6 hours at temperatures in the range of 175° to 250° F. to form a product containing a mixture of the dimers of said cyclopentadienes, topping the heat-soaked product to produce as bottoms a material containing $C_{10}$ and higher hydrocarbons consisting of a crude mixture of dimers of from 40 to 75% cyclopentadiene and of from 15 to 45% of methyl cyclopentadiene, hydrogenating the said dimers in the presence of a hydrogenation catalyst at temperatures of from about 75° to about 200° F. and hydrogen pressures of from 1 to 200 atmospheres, whereby dihydro derivatives of the said dimers are formed, and thereafter subjecting the hydrogenated product to a second hydrogenation step at temperatures of from about 225° to about 450° F. whereby tetrahydro derivatives of the said dimers are obtained.

3. A method as defined in claim 2 wherein said second hydrogenation step is carried out at pressures of from 30 to 200 atmospheres.

4. A method as defined in claim 2 wherein said fraction segregated from said mixture of cracked hydrocarbons is a fraction boiling in the range of about 75° F. to about 200° F.

5. A method as defined in claim 2 wherein said second hydrogenation step to the tetrahydro derivatives is carried out at pressures of from 30 to 200 atmospheres.

6. A method as defined in claim 2 wherein said segregated fraction is subjected to heat soaking at temperatures of from 200 to 220° F. and at pressures of from 2 to 10 atmospheres.

7. A method as defined in claim 2 wherein said hydrogenating of the said dimers to the dihydro derivatives is carried out in a reaction time of from 0.25 to 5 hours.

8. A method as defined in claim 2 wherein said second hydrogenation step to the tetrahydro derivatives is carried out in a reaction time of from 0.5 to 10 hours.

9. A method as defined in claim 2 wherein said hydrogenation catalyst is Raney nickel.

10. An improved jet fuel as defined in claim 1 wherein said hydrogenation of said dimers is carried out with 1% Raney nickel at temperatures of from 75° F. to 120° F. and at hydrogen pressures of from 500 to 1000 p.s.i.g.

References Cited in the file of this patent

UNITED STATES PATENTS

| | | |
|---|---|---|
| 2,706,211 | Clark | Apr. 12, 1955 |
| 2,712,497 | Fox et al. | July 5, 1955 |
| 2,765,617 | Gluesenkamp | Oct. 9, 1956 |